Dec. 15, 1936.   H. HODGSON   2,064,345
SOLAR HEATER
Filed Dec. 12, 1934   2 Sheets—Sheet 1

INVENTOR.
Harold Hodgson
BY Louis C. Vanderlip
ATTORNEYS.

Dec. 15, 1936.   H. HODGSON   2,064,345
SOLAR HEATER
Filed Dec. 12, 1934   2 Sheets-Sheet 2

INVENTOR.
Harold Hodgson
BY Louis C. Vanderlip.
ATTORNEYS.

Patented Dec. 15, 1936

2,064,345

UNITED STATES PATENT OFFICE 2,064,345

SOLAR HEATER

Harold Hodgson, Goshen, Ind.

Application December 12, 1934, Serial No. 757,147

3 Claims. (Cl. 126—271)

This invention relates to solar heaters, and particularly to such as are designed for exposition to the sun's rays to heat water for household use.

A main object of my invention is to provide an improved solar water heater wherein the water tank and heat collector casings are united to form a self contained heater unit.

Another object is to provide a solar water heater in which the heat collector unit includes a plurality of upright water coil elements arranged within a casing and extending in a longitudinal series therein, and wherein said coil elements are connected with horizontal water inlet and outlet headers which are connected with a water tank.

A third object is to provide a solar water heater in which the heat collector unit includes a plurality of upright return bend water coil elements arranged within an insulated casing and extending in a longitudinal series therein, and wherein said coil elements are connected with horizontal inlet and outlet header pipes.

A further object is to provide a solar water heater in which the heat collector unit includes a plurality of water coil elements arranged within an insulated casing and extending in a longitudinal series therein, some of said coil elements being mounted within containers filled with heat retaining fluid.

Other and more specific objects of the invention are mentioned and described herein.

The invention is illustrated in the accompanying drawings, wherein

Similar numerals of reference indicate like parts throughout the several views on the drawings.

Figure 1:
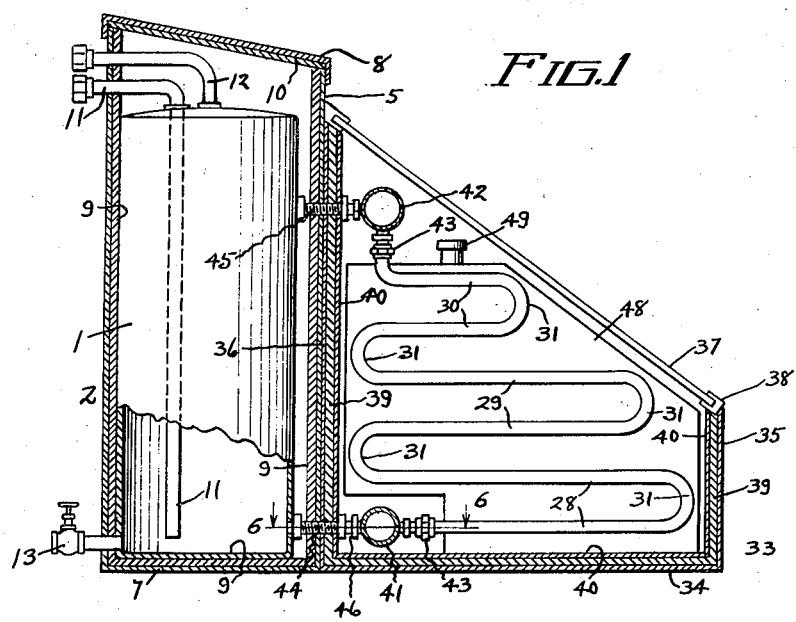
Figure 1 is a vertical transverse sectional view through a solar water heater constructed in accordance with the present invention.

Referring now to the details of the drawings the numeral 1 indicates a water storage tank arranged within the sheet metal tank casing 2 which may have the necessary side walls 3, 4, 5, and 6 together with a bottom 7 and a removable top 8. The interior of the tank casing 2 is lined throughout with a slab-like non-heat conducting material 9 including the top slab element 10 which is enclosed by the cover 8. The tank 1 is provided with a water inlet pipe 11 which projects through the wall of the casing 2 to the exterior thereof and which may extend downward into said tank to a point interiorly of and adjacent the tank bottom. A water outlet pipe 12 is suitably connected with the tank top and extends to the tank casing exterior through the wall of the latter. A drain cock or valve 13 may be operatively connected with the tank 1 adjacent the bottom thereof by a suitable nipple or short pipe for draining said tank when desirable.

The water heater unit, or heat collector, includes a plurality of pipe elements 14 to 27 inclusive and which are preferably made of one half inch copper tubing, each of which is preferably bent back and forth to provide a plurality of parallel sections 28 to 30, inclusive, of various lengths, connected by the return bend sections 31 thereof. In each of these heater units the shorter section 30 thereof is disposed at the top of the unit, and the longer section 28 at the bottom thereof and gradually diminishing in length in successive order from the bottom to the top of the heater unit. Preferably, each of the pipe coil elements 14 to 27 inclusive is painted black exteriorly to enhance the heat absorptive properties thereof. The heater pipe elements 14 to 27, inclusive, are all spacedly arranged in an upright position within a sheet metal casing 33 which may be substantially rectangular in formation and which may have a bottom 34, a front wall 35, a rear wall 36, and suitable end walls—not shown—rigidly connected with said bottom and front and rear walls, said pipe elements being arranged transversely of the casing and in a longitudinal series therein.

A glass cover 37 is provided for the casing 33, said cover being mounted in a suitable frame 38 which is arranged at an acute angle relatively to the casing bottom to admit the sun's rays to contact the pipe elements, or heat collectors, within said casing most efficiently. The entire interior of the casing 33, exclusive of the top thereof, is lined with a slab-like heat non-conducting lining 39 and the latter is enclosed by a sheet metal lining 40 which has its inner surface painted black to enhance the heating efficiency of the casing unit.

Each of the pipe elements 14 to 27, inclusive, has its water inlet and outlet ends detachably connected with the horizontally arranged water inlet and outlet header pipes 41 and 42, respectively, by a suitable screw union 43, and said headers are detachably connected with the tank 1 by a pair of nipples 44 and 45, respectively, which traverse suitable openings in the adjacent walls of the casings 2 and 33, a suitable screw union 46 being provided to effect the detachable connection with each of said headers. For rigidly securing the walls 36 and 5 of the casings 33 and 2, respectively, together a clamping nut 47 is threaded on each of the nipples 44 and 45, said nut being adapted to be snugly screwed against the heater casing wall 40 to draw said casing walls snugly together.

A feature of my invention is the disposition of several of the water coils within a container filled with heat retaining fluid, whereby said fluid will continue to heat water after the sun's rays have ceased to contact the exposed water coils.

Figure 2:
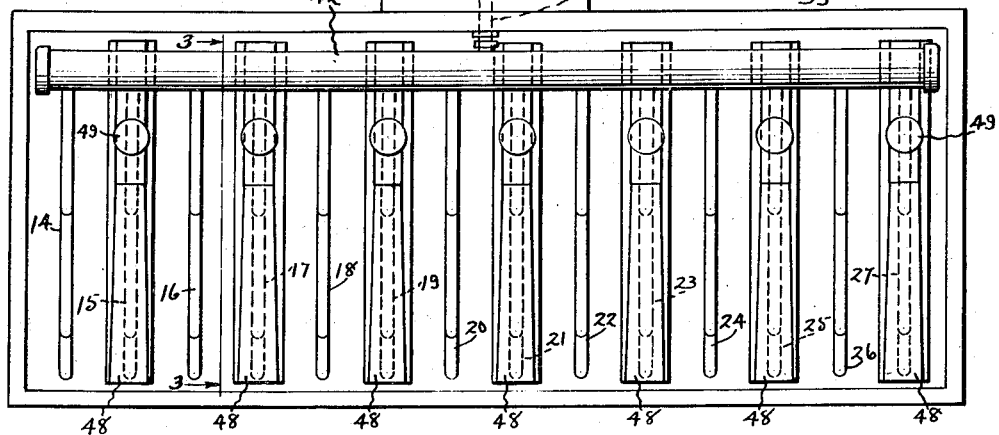
Figure 2 is a top plan view thereof, illustrating the water tank casing partially in section.
Figure 3:
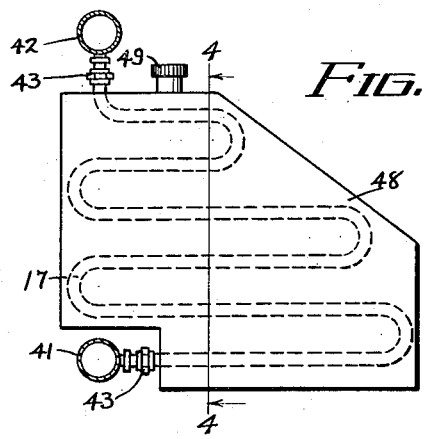
Figure 3 is a side elevation of one of the coil and heat retaining fluid containers.
Figure 4:
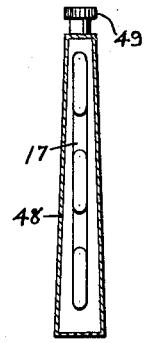
Figure 4 is a section taken on line 4—4 of Fig. 3.
Figure 5:
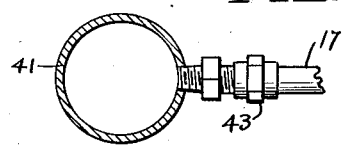
Figure 5 illustrates a fragmental view of the union connection between the inlet of one of the water coils and the inlet header.
Figure 6:
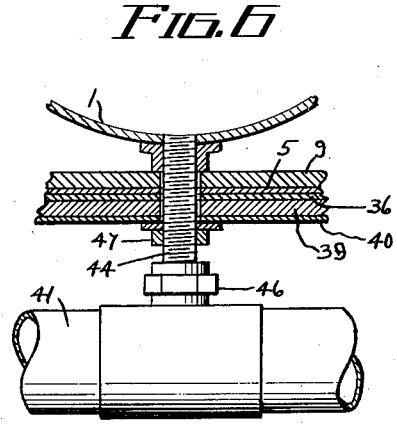
Figure 6 illustrates a section taken on line 6—6 of Figure 1.

This feature is clearly illustrated in Figures 3 and 4 of the drawings, and, as illustrated in Fig. 2, the pipe coil elements 15, 17, 19, 21, 23, 25, and 27 are each rigidly mounted within an upright relatively flat container or can 48, the latter having a closed top which is provided with a screw filler cap 49 said can to be filled with any kind of suitable heat retaining fluid such as a cheap grade of oil. In this combination of the pipe coils and the cans 48 the water inlet and outlet ends of the pipe coils project to the exterior of said cans for detachable connection with the water headers 41 and 42, respectively. To prevent leakage of the oil from the can 48 the points where the ends of the pipe coil depart therefrom are suitably soldered. The spaces between the slabs 9 and 10 and the water tank 1 may be filled with any suitable granular heat non-conducting material to effectually insulate the tank.

I claim:

1. In a solar heater the combination of a casing, a series of upright heating units arranged in a longitudinal series in said casing, each of said heating units comprising a plurality of superimposed horizontally arranged connected pipe sections gradually diminishing in length in successive order from the bottom to the top of the heating unit, a water inlet header connected with the bottom of said heating units, and a water outlet header connected with the top of said heating units.

2. In a solar heater, the combination of a casing having a side transparent to solar radiation, a series of upright heating units arranged in a longitudinal series in said casing, each of said heating units comprising a plurality of parallel superimposed horizontally arranged connected pipe sections gradually diminishing in length in successive order from the bottom to the top of the heating unit, a water inlet header in said casing connected with all of said heating units adjacent the bottom thereof, and a water outlet header in said casing connected with all of said heating units adjacent the top thereof.

3. In a solar heater, the combination of a casing having a side transparent to solar radiation, a series of upright heating units arranged in a longitudinal series in said casing, each of said heating units being formed from a single length of copper tubing and comprising a plurality of parallel superimposed horizontally arranged sections gradually diminishing in length in successive order from the bottom to the top of each heating unit, a water inlet header in said casing operatively connected with all of said heating units adjacent the bottom thereof, and a water outlet header in said casing operatively connected with all of said heating units adjacent the top thereof.

HAROLD HODGSON.